L. G. Youngs.
Corn Planter.
N° 48,758. Patented Jul. 11, 1865.
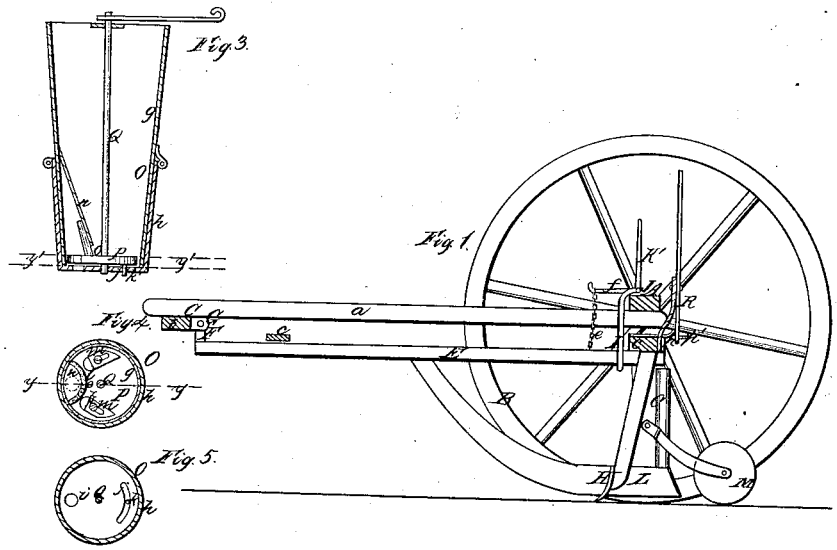
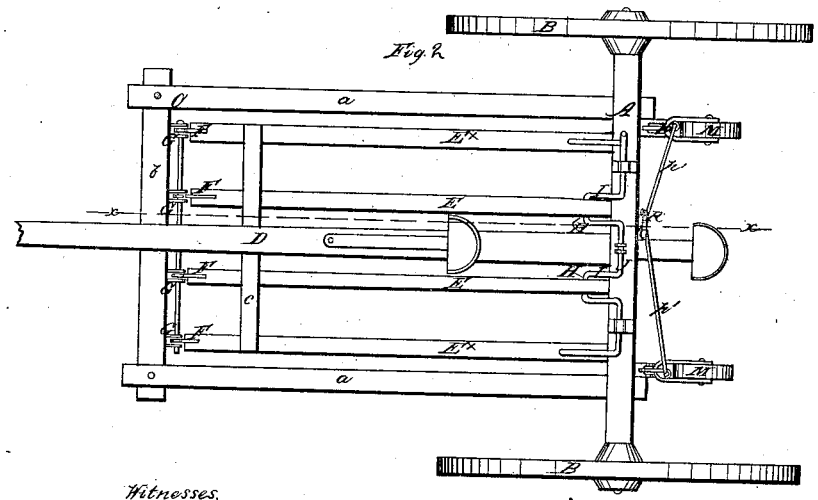
Witnesses: Inventor:

Sheet 2-2,Sheets.

L. G. Youngs.
Corn Planter.

Nº 48,758. Patented Jul. 11, 1865.

Witnesses,
Wm Crewn
Theo Tusch

Inventor:
L. G. Young
By Munn & Co.
Attys

UNITED STATES PATENT OFFICE.

L. G. YOUNGS, OF WILMINGTON, ILLINOIS.

IMPROVEMENT IN CULTIVATORS.

Specification forming part of Letters Patent No. 48,758, dated July 11, 1865.

*To all whom it may concern:*

Be it known that I, L. G. YOUNGS, of Wilmington, in the county of Will and State of Illinois, have invented a new and Improved Corn Planter and Cultivator; and I do hereby declare that the following is a full, clear, and exact description thereof, which will enable those skilled in the art to make and use the same, reference being had to the accompanying drawings, forming part of this specification, in which—

Figure 6:
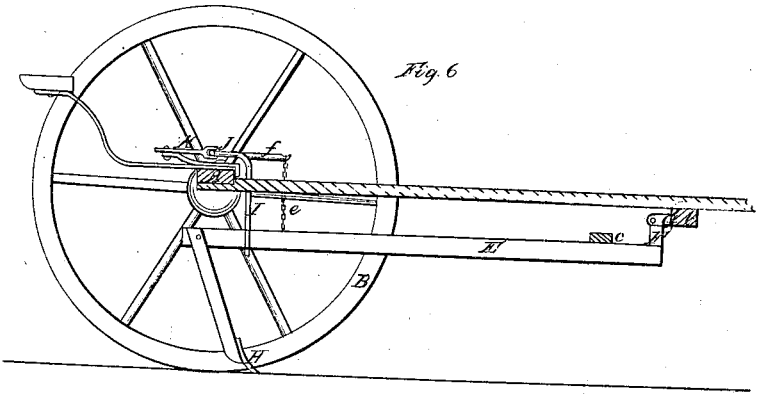
Figure 7:
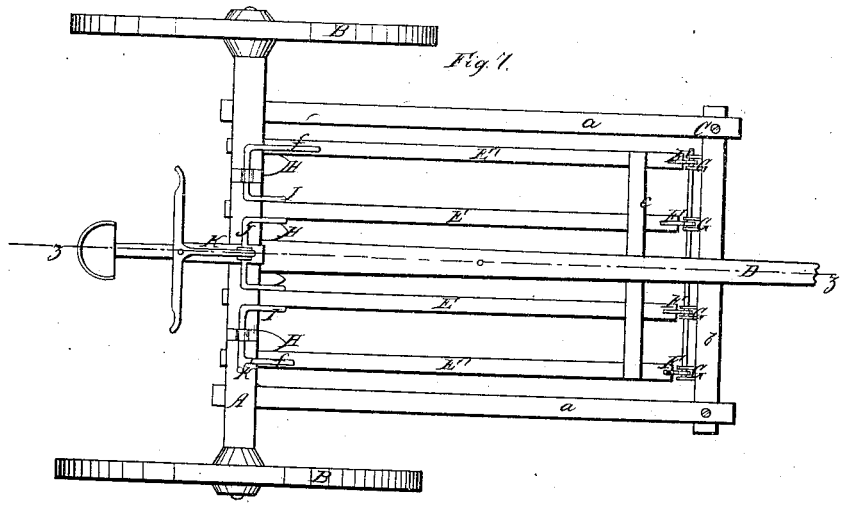

Figure 1, Sheet No. 1, is a side sectional view of my invention arranged as a corn-planter, taken in the line $x\,x$, Fig. 2; Fig. 2, a plan or top view of the same; Fig. 3, a vertical section of the hopper and seed-dropping device pertaining to the same, taken in the line $y\,y$, Fig. 4; Fig. 4, a horizontal section of Fig. 3, taken in the line $y'\,y'$; Fig. 5, an inverted plan or bottom view of the hopper; Fig. 6, Sheet No. 2, a side sectional view of the device arranged as a cultivator, taken in the lines $z\,z$, Fig. 7; Fig. 7, a plan or top view of the same.

Similar letters of reference indicate corresponding parts.

This invention relates to a new and improved device for planting corn, and also for plowing and cultivating corn and other crops which are grown in hills or drills; and it relates to a new and improved means for adjusting the plows laterally, so that the same may be made to conform to the sinuosities of the rows of plants when the device is used as a cultivator.

A represents an axle, having a wheel, B, on each end of it, and C is a frame composed of two parallel bars, $a\,a$, connected at their front ends by a cross-bar, $b$, the rear of the bars $a\,a$ being attached to the axle A.

D is the draft-pole, which is attached to the center of the axle A and cross-bar $b$, and E E E′ E′ (see Figs. 6 and 7) are four bars, the front ends of which have metal plates F secured to them, said plates being fitted in brackets G attached to the cross-bar $b$, the plates F being secured in the brackets by means of a rod, G. These bars E E E′ E′ have plows H attached to their rear ends, and the outer bars, E E′, are connected near their front and rear ends by cross-bars $c$, the two central bars, E E, being free. These latter bars, E E, are fitted in loops I, which extend down from a shaft, J, the bearings of which are on the axle A, and this shaft is allowed to slide in its bearings in order to give a lateral movement to the two central plows when required, in order that the said plows may conform to the sinuosities of the rows of plants. This sliding movement of the shaft J is effected by the feet of the driver acting against a T-shaped lever, K. The bars E′ E′ are connected by chains $e\,e$ to arms $f\,f$ on the shaft J, and this shaft has a lever, K′, at one end of it, by moving which the shaft J will be turned and the bars E E E′ E′ raised, and consequently the plows, through the medium of the loops I and the chains $e\,e$ and arms $f\,f$.

The above parts comprise the cultivator, and it will be seen that the plows of the central bars, E E, may be adjusted laterally with the greatest facility, in order that the plows attached to said bars may be moved to conform to the sinuosities of the rows of plants, and that all the plows may be raised out of the ground when required. When the device is used as a corn-planter the bars E′ E′ are detached and others, $E^x\,E^x$, inserted in their place. (See Figs. 1 and 2.) These bars $E^x$ are provided with furrow-openers L and with pressure and covering rollers M.

To a standard, N, of each bar $E^x$, there is secured a hopper, O, composed of a cylindrical or conical sheet-metal box, $g$, inserted in a cast-iron cup, $h$. These cups $h$ have each a circular hole, $i$, in them to admit of the seed passing through, and have also a curved slot, $j$, in which a pin, $k$, attached to the distributer P is fitted and works said slot and pin, serving to limit the movement of the distributer. (See Fig. 5.)

The distributer is a circular disk, having two holes, $l\,l$, made in it, each of which is provided with a slide, $m$, by adjusting which the capacity of the holes $l$ may be varied according to the number of seed required for each dropping. (See Fig. 4.)

The sheet-metal box $g$ has a partition, $n$, within it provided with a brush, $o$, at its lower end to serve as a cut-off.

The seed-distributing apparatus of both hoppers are precisely alike, and the seed is discharged by turning the disks P first in one direction and then in the other, so that the holes $l\,l$ will pass alternately under the cut-off brushes $o$ and come in line with the hole $i$, which the partition $n$ cuts off from the interior of the hoppers, and cause the seed to be discharged into the furrows, the holes $l$ being filled with seed as they pass within the hoppers.

The disks P are operated by being attached to the lower ends of shafts Q, the upper ends of which have cranks $p$ on them, the inner ends of the latter being connected by rods $p'$, to the lower end of a lever, R, which is within the reach of the attendant or driver. The driver's seat, when the device is used as a corn-planter, is secured to the draft-pole D, as shown in Fig. 2.

Having thus described my invention, I claim as new and desire to secure by Letters Patent—

The plow-bars E E E' E' and shaft J, provided with the loops I I and arms $ff$, all arranged and applied in connection with the levers K', to operate in the manner substantially as and for the purpose set forth.

L. G. YOUNGS.

Witnesses:
M. H. HILBURN,
D. W. DILLMAN.